No. 794,150. PATENTED JULY 4, 1905.
C. HERTZ.
FRUIT GATHERER.
APPLICATION FILED SEPT. 19, 1904.
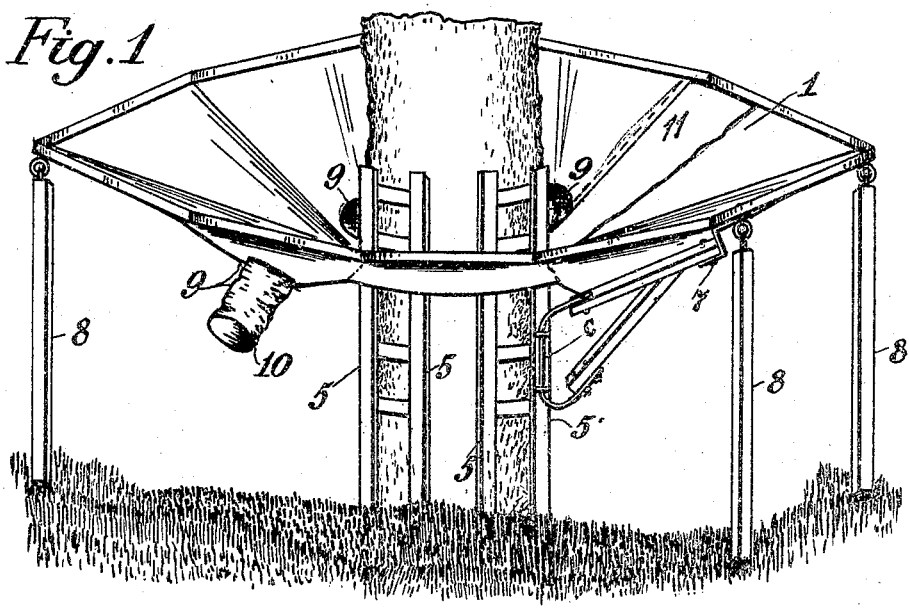
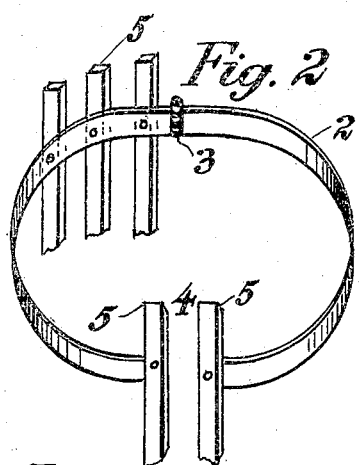
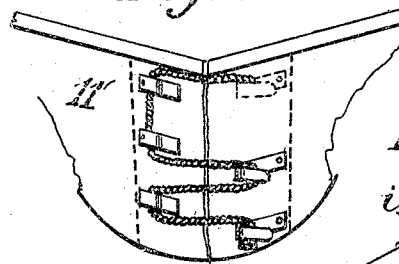
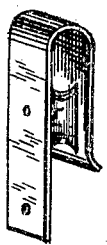
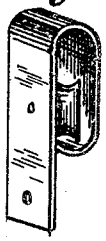
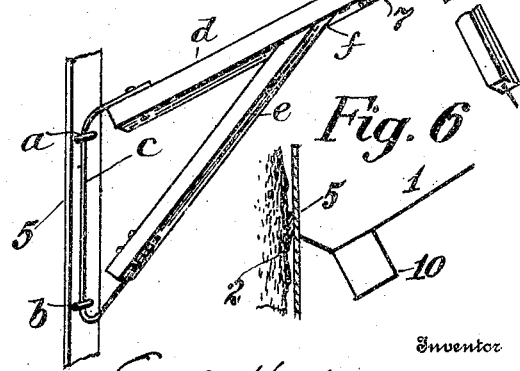
Witnesses
C. M. Billig.
W. R. Grandy
Inventor
Carl Hertz
by
Frank P. Medina
Attorney No. 794,150.

Patented July 4, 1905.

UNITED STATES PATENT OFFICE.

CARL HERTZ, OF SAN FRANCISCO, CALIFORNIA.

FRUIT-GATHERER.

SPECIFICATION forming part of Letters Patent No. 794,150, dated July 4, 1905.

Application filed September 19, 1904. Serial No. 225,160.

*To all whom it may concern:*

Be it known that I, CARL HERTZ, a subject of the Emperor of Germany, and a resident of the city and county of San Francisco, State of California, have invented a certain new and useful Improvement in Fruit-Gatherers, of which the following is a specification.

My invention relates to improvements in devices for gathering fruit from trees; and its objects are to provide a device for gathering fruit that will perform its function without injury to the fruit gathered and to be easily and rapidly set up and moved from tree to tree.

I accomplish my objects by means illustrated in the accompanying drawings, of which—

Figure 1 is a perspective view of my device set up about the trunk of a tree; Fig. 2, a detail of the means for clasping and supporting the same; Fig. 3, a bottom view of part of my device, showing my mode of fastening the parts together; Fig. 4 and Fig. 7, details of said fastening part; Fig. 5, a view of the ribs and braces of my device, or more exactly of one of them; Fig. 6, a diagrammatic view the purpose of which will more fully appear herein.

Similar letters and numerals distinguish similar parts throughout the various views.

My invention consists of the combination of a web having a flap, with braces and arms and other parts fully described herein comprising means of setting up, using, and removing a device for gathering fruit, as well as the device itself.

It comprises a web 1 of flexible material, the inner edge of which is secured to a ring 2, Fig. 2, said ring being hinged at 3 and separable at 4. Ring 2 has attached thereto a plurality of arms 5 substantially at right angles to the plane of said ring and being adapted to clasp the trunk of a tree when said trunk is encircled by said ring. Spreading upward and outward from the said ring like an inverted umbrella, Fig. 1, the said web is maintained in its shape by a plurality of ribs and braces, one only being shown in Fig. 1 in order not to obscure the view and the details of construction thereof being shown in Fig. 5.

Reference to the drawings will show that the said ribs and braces are hinged to the arms 5, as shown in Fig. 1, and are attached at their outer ends to the outer edge of said web, as at 7, whereby the said web is maintained in the shape shown. Said ribs being hinged, when ring 2 is opened my device becomes collapsible and may be folded into small space, it being understood that said web is separable along one of its radii from outer to inner edge at the part thereof adjacent to the part 4 of inner ring. A plurality of upright supports 8, loosely attached to the ends of ribs $d$, as at 7, serves to supplement the braces and ribs aforesaid in maintaining the shape desired. Fig. 5 shows in larger scale the rib-brace and upright support. Reference to Fig. 5 shows one of the aforesaid arms 5, to which two staples $a$ $b$ are attached. Through said staples the bent rod $c$ works as in a hinge. To the upper part of said rod the rib $d$ is attached and to the lower part the brace $e$, said brace being attached to said rib at $f$. The support 8 is loosely attached to said rib through the staple $g$, ring $h$, and angular piece $i$ at 7. The edges of the separable part of the web along the radius aforesaid are held together by means of cord and fasteners, Fig. 3, said fasteners being shown in larger scale in Figs. 4 and 7. I provide a plurality of apertures 9 in said web, said apertures being inserted near to the ring 2 and each of them having a bottomless pocket or sack 10 beneath it. Under this sack a receptacle for the fruit is placed, and in this receptacle the fruit gathered by my fruit-gatherer finds its final lodgment. Fig. 6 shows the situation of these pockets in diagrammatic form, the web 1 being made full, so as to hang downward somewhat from arms 5.

The operation of my device is as follows: The trunk of the tree from which the fruit is to be gathered is encircled by a ring 2 by slipping through the opening 4. The edges of the web are then pulled together and laced, as in Fig. 3, and laced tightly enough to cause the arms 5 to grip said trunk with sufficient firmness. The upright supports thereupon drop their lower ends to the ground from their suspended ends at the outer edges of the web and help to support my device in the desired position. The fruit is thereupon dropped from the tree into the web, which being soft and flexible does not injure it, and thereafter the fruit rolls into the said apertures and bottomless pockets 9 10 and into the boxes provided to receive it. A flap 11 in the web is provided to cover the fastener and aforesaid line of separation in order to protect the fruit against contact with the said fastener and also to cover said line of separated edges. When the fruit of one tree is thus gathered, the flap 11 is thrown back, the cord unlaced from the fasteners, and the whole device collapsed by laying the ribs and braces closely together, whereupon the web assumes a plaited or accordion shape. The fruit-gatherer is then taken up and moved to the next tree.

Where the trunks of the trees are very large, so as to call for a fruit-gatherer of large size and heavy weight, the removal from tree to tree is accomplished by loading my device on a cart, wagon, or barrow.

What I claim as new, and desire to protect by Letters Patent of the United States, is—

1. A fruit-gatherer, comprising in combination a ring divided in two parts hinged together, provided with arms substantially at right angles to the plane thereof and adapted to stand on the ground about a tree-trunk and to clasp the same, a web having its inner edge attached to said ring, and having a radial slit coincident with an opening in said ring, a plurality of ribs, braces supporting said ribs, said ribs and braces being hinged to said arms and being attached to the outer edge of said web, fasteners along the edge of said slit, and a cord adapted to coöperate with said fasteners in closing said slit, and a plurality of supports loosely attached to the extremities of said ribs.

2. In a fruit-gatherer having a web with a radial slit, collapsible means of supporting said web, comprising a plurality of arms a ring to which said arms are fixed, ribs and braces hinged to said arms, the inner edge of said web being attached to said ring and the outer edge to said ribs, and a plurality of supports loosely attached to said ribs.

3. In a fruit-gatherer, the combination with a web for catching the fruit of means of folding the same into small compass, comprising a hinged ring divided into two parts movable about said hinge, a plurality of arms fixed to said ring, and a plurality of ribs and braces hinged to said arms, whereby when said ring is opened, said web, braces and ribs lie compactly together.

In testimony whereof I have hereunto subscribed my name in the presence of two witnesses.

CARL HERTZ.

Witnesses:
C. M. BILUG,
MARTIN ARONSOHN.